United States Patent
Howe et al.

(10) Patent No.: US 9,813,384 B2
(45) Date of Patent: Nov. 7, 2017

(54) TIME-LOCKED NETWORK AND NODES FOR EXCHANGING SECURE DATA PACKETS

(71) Applicant: The Boeing Company, Chicago, IL (US)

(72) Inventors: Wayne R. Howe, Irvine, CA (US); Jeffrey H. Hunt, Thousand Oaks, CA (US); Angela Wai-an Li, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 563 days.

(21) Appl. No.: 13/664,966

(22) Filed: Oct. 31, 2012

(65) Prior Publication Data

US 2014/0122736 A1 May 1, 2014

(51) Int. Cl.
*G06F 15/16* (2006.01)
*H04L 29/06* (2006.01)

(52) U.S. Cl.
CPC ........ *H04L 63/0428* (2013.01); *H04L 63/105* (2013.01); *H04L 63/20* (2013.01)

(58) Field of Classification Search
CPC ... H04J 3/0638; H04J 3/0682; H04L 12/5601; H04L 2209/60; H04L 47/10; H04L 47/14
USPC ........ 709/230, 231, 232, 233, 234, 235, 246
See application file for complete search history.

(56) References Cited

U.S. PATENT DOCUMENTS

| | | | | |
|---|---|---|---|---|
| 4,881,263 A | * | 11/1989 | Herbison | H04L 9/083 380/28 |
| 5,761,417 A | * | 6/1998 | Henley | G06F 3/061 709/231 |
| 6,611,519 B1 | | 8/2003 | Howe | |
| 7,212,551 B1 | * | 5/2007 | Beshai | H04J 3/0664 370/509 |
| 7,324,510 B2 | | 1/2008 | Howe | |
| 2005/0058149 A1 | * | 3/2005 | Howe | H04L 47/10 370/428 |
| 2007/0071007 A1 | * | 3/2007 | Ross | H04L 63/164 370/392 |
| 2010/0306540 A1 | * | 12/2010 | Yamada | H04L 63/0485 713/168 |
| 2011/0087879 A1 | * | 4/2011 | Chand | H04K 3/25 713/153 |

(Continued)

OTHER PUBLICATIONS

Extended European Search Report, dated Jan. 29, 2014, regarding Application No. EP13191120.8, 4 pages.

(Continued)

*Primary Examiner* — Edward Kim
(74) *Attorney, Agent, or Firm* — Yee & Associates, P.C.

(57) ABSTRACT

A method and apparatus for transmitting secure data packets through a node network. Unsecure data packets are received at a set of unsecure inputs and secure data packets are received at a number of secure inputs in a node in the node network. The secure data packets are authorized to be sent to a number of secure destination devices. The unsecure data packets are not authorized to be sent to the number of secure destination devices. The secure data packets and the unsecure data packets are integrated to form a number of output data streams based on a predetermined schedule. The number of output data streams is sent to a number of next nodes in the node network.

20 Claims, 11 Drawing Sheets

(56) References Cited

U.S. PATENT DOCUMENTS

2012/0209971 A1\* 8/2012 Howe ................ H04L 63/0428
  709/223

OTHER PUBLICATIONS

Extended European Search Report, dated Aug. 5, 2015, regarding Application No. EP15172047.1, 3 pages.
IP Australia Patent Examination Report No. 1, dated Jun. 30, 2016, regarding Application No. 2013207584, 3 pages.

\* cited by examiner

TIME-LOCKED NETWORK AND NODES FOR EXCHANGING SECURE DATA PACKETS

BACKGROUND INFORMATION

1. Field

The present disclosure relates generally to managing a network and, in particular, to managing the exchange of data between nodes within a network. Still more particularly, the disclosure relates to a configuration for a node in a network that allows secure data to be received and transmitted based on a predetermined schedule.

2. Background

Networks are frequently used to exchange data between hardware devices such as, for example, computers, servers, user devices, and other types of devices. As used herein, a "network" may be comprised of one or more computer networks that are interconnected. This type of network may also be referred to as an "internetwork". A "computer network", as used herein, is a collection of computers and/or processors that are interconnected by communications channels that allow data to be exchanged. The Internet is an example of a network comprised of multiple interconnected computer networks.

The data exchanged between hardware devices in a network may take the form of, for example, data streams. Each data stream may be comprised of data packets. Data packets may also be referred to as network packets in some cases. Exchanging data may include receiving data packets and/or sending data packets.

Data may be transmitted from a source device in a network to a destination device in the network using one or more nodes in the network. As used herein, a "node" includes any hardware equipment that may be used to receive data packets, process these data packets, and then send these data packets to one or more other nodes in the network and/or to a destination device. The data packets received at the node may be received from a source device and/or from one or more nodes in the network.

The hardware equipment that forms a node may include, for example, without limitation, any number of routing devices, switching devices, buffers, control lines, gateways, and/or other types of equipment. The different nodes in a network form a node network within the network.

In some situations, an undesired inconsistency may occur during the exchange of data within a network. The undesired inconsistency may be, for example, without limitation, a buffer overflow, a denial of service event, a server crash, a loss of data packets, or some other type of undesired event that occurs during the exchange of data. Various solutions for reducing the possibility of an undesired inconsistency during the exchanging of data within a network are currently available. However, some of these currently available solutions may not be as effective as desired.

For example, some currently available solutions may be able to prevent only certain types of undesired inconsistencies and not others. For example, some currently available methods for preventing buffer overflow use software addressing or memory techniques. However, these techniques may be unable to protect against heap overflows as well as stack-based overflows.

As another example, some currently available methods for preventing denial of service events may try to stop the flow of data packets received from unauthorized source devices by denying data packets received from certain ports, data packets received from certain internet protocol (IP) addresses, and/or data packets received based on certain communications protocols. However, these methods may be unable to protect against unauthorized source devices that use for example, without limitation, protocol spoofing, internet protocol address spoofing, and/or other types of techniques. Therefore, it would be desirable to have a method and apparatus that takes into account at least some of the issues discussed above, as well as other possible issues.

SUMMARY

In one illustrative embodiment, a method for transmitting secure data packets through a node network is provided. Unsecure data packets are received at a set of unsecure inputs and secure data packets are received at a number of secure inputs in a node in the node network. The secure data packets are authorized to be sent to a number of secure destination devices. The unsecure data packets are not authorized to be sent to the number of secure destination devices. The secure data packets and the unsecure data packets are integrated to form a number of output data streams based on a predetermined schedule. The number of output data streams is sent to a number of next nodes in the node network.

In another illustrative embodiment, a method for transmitting secure data packets to a number of secure destination devices is provided. A number of input data streams are received at a node in a node network. The secure data packets are separated from unsecure data packets received in the number of input data streams based on a predetermined schedule. The secure data packets are authorized to be sent to the number of secure destination devices. The unsecure data packets are not authorized to be sent to the number of secure destination devices. The secure data packets are sent to the number of secure destination devices as a number of secure output data streams from a number of secure outputs in the node.

In yet another illustrative embodiment, a node in a node network comprises a number of secure inputs, a set of unsecure inputs, a timing controller, and a number of outputs. The number of secure inputs is configured to receive secure data packets. The secure data packets are authorized to be sent to a number of secure destination devices. The set of unsecure inputs is configured to receive unsecure data packets. The unsecure data packets are not authorized to be sent to the number of secure destination devices. The timing controller is configured to control integration of the secure data packets and the unsecure data packets into a number of output data streams based on a predetermined schedule. The number of outputs is configured to send the number of output data streams to a number of next nodes in the node network.

In still yet another illustrative embodiment, a node in a node network comprises an number of inputs, a timing controller, and number of secure outputs. The number of inputs is configured to receive a number of input data streams from a number of previous nodes in the node network. The timing controller is configured to separate secure data packets from unsecure data packets received in the number of input data streams based on a predetermined schedule. The secure data packets are authorized to be sent to a number of secure destination devices. The unsecure data packets are not authorized to be sent to the number of secure destination devices. The number of secure outputs is configured to send the secure data packets to the number of secure destination devices as a number of secure output data streams.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
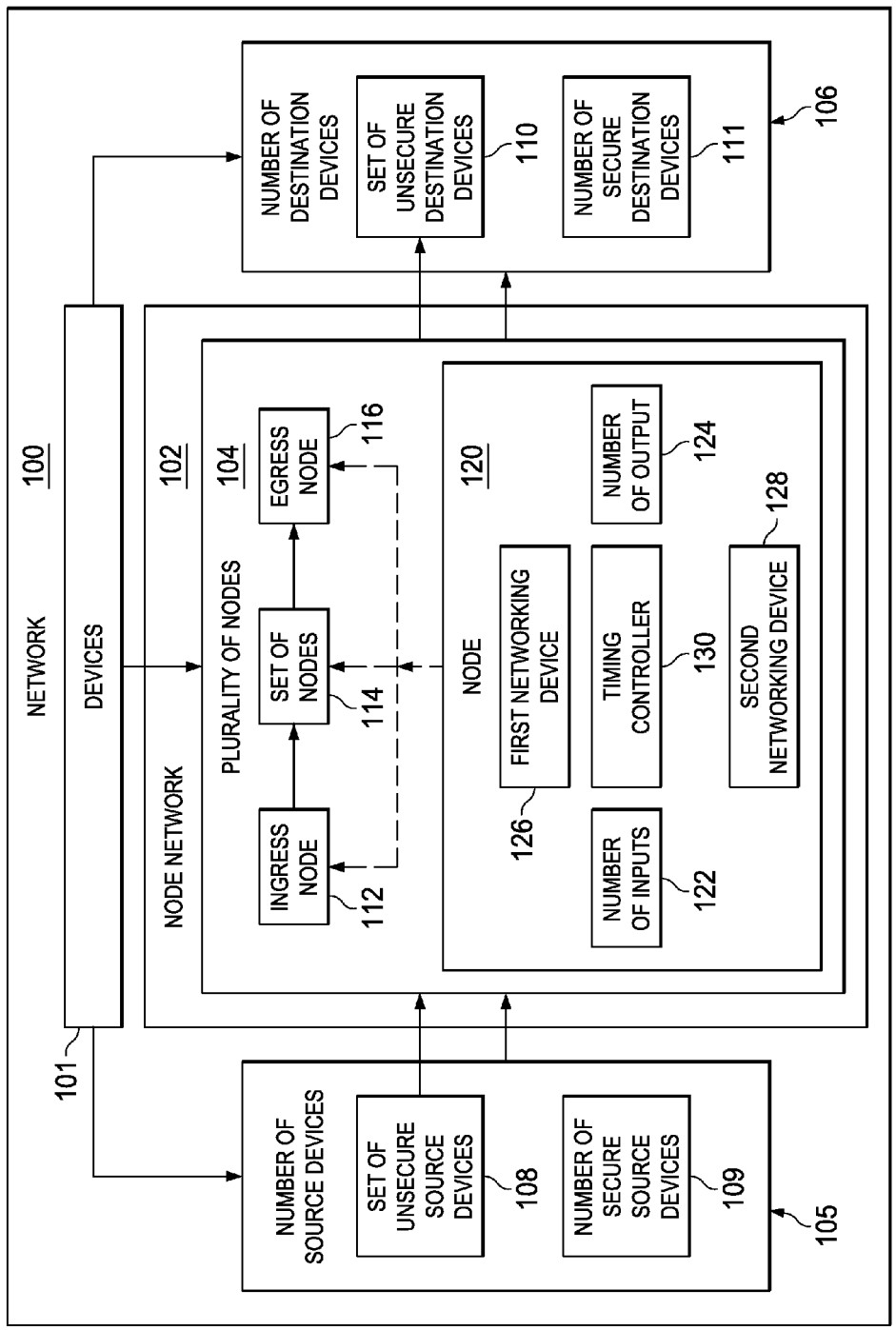
FIG. 1 is an illustration of a network in the form of a block diagram in accordance with an illustrative embodiment.

The different illustrative embodiments recognize and take into account a number of different considerations. For example, the illustrative embodiments recognize and take into account that some currently available solutions for reducing the possibility of undesired inconsistencies occurring during the transmission of data over a network may not be as effective as desired. In particular, solutions that include, for example, bounds checking, canary values, tagging, and/or other techniques may be unable to protect against as wide a range of undesired inconsistencies as desired.

For example, some currently available solutions may be unable to prevent a potential hacker from introducing an undesired inconsistency into a data stream of secure data packets. As used herein, "secure data packets" may include data packets that are both authorized for transmission through the network and/or authorized to reach a secure destination device for the data packets. These data packets, for example, may be encrypted, may be password-protected, and/or may meet selected authentication criteria. Further, "unsecure data packets" may include data packets that may or may not be authorized for transmission through the network but that are not authorized to reach the secure destination device.

The illustrative embodiments recognize and take into account that it may be desirable to transmit secure data packets from a source device across a node network to a destination device using a predetermined node pathway and a predetermined schedule. The predetermined node pathway may identify the ingress node at which the secure data packets may enter the node network from the source device and the egress node at which the secure data packets may exit the node network to the destination device. Further, the predetermined node pathway may identify any nodes through which the secure data packets may pass between the ingress node and the egress node.

The predetermined schedule may identify the specific times at which each node along the predetermined node pathway may transmit the secure data packets. In particular, each secure data packet may be required to be transmitted from a node at a specified time. This type of node network across which secure data packets may be transmitted may be referred to as a time-locked node network.

The illustrative embodiments recognize and take into account that a time-locked node network may be capable of providing a desired level of protection against unauthorized users and unauthorized devices attempting to cause undesired inconsistencies to occur during the transmission of secure data packets. With a time-locked node network, an unauthorized user or unauthorized device may need to know the specific times at which secure data packets are to be transmitted from a particular node as well as the particular nodes that are part of the predetermined node pathway to be able to cause undesired inconsistencies to occur during the transmission of the secure data packets.

The illustrative embodiments recognize and take into account that a time-locked node network may provide a wider range of protection and a greater level of protection against undesired inconsistencies as compared to some currently available solutions. Further, the illustrative embodiments recognize and take into account that the ingress node and the egress node in a predetermined node pathway for the transmission of secure data packets may need to have configurations capable of controlling the processing and transmission of the secure data packets based on the predetermined schedule.

Thus, the illustrative embodiments provide a configuration for an ingress node and a configuration for an egress node. In one illustrative embodiment, a method for transmitting secure data packets through a node network is provided. Unsecure data packets are received from a set of unsecure source devices and secure data packets from a number of secure source devices at a node in the node network. The secure data packets are authorized to be sent to a number of secure destination devices. The unsecure data packets are not authorized to be sent to the number of secure destination devices. The secure data packets and the unsecure data packets are integrated to form a number of output data streams based on a predetermined schedule. The number of output data streams is sent to a number of next nodes in the node network.

In another illustrative embodiment, a method for transmitting secure data packets to a number of secure destination devices is provided. A number of input data streams is received. The secure data packets are separated from unsecure data packets received in the number of input data streams based on a predetermined schedule. The secure data packets are authorized to be sent to the number of secure destination devices. The unsecure data packets are not authorized to be sent to the number of secure destination devices. The secure data packets are sent to the number of secure destination devices as a number of secure output data streams.

With reference now to FIG. 1, an illustration of a network in the form of a block diagram is depicted in accordance with an illustrative embodiment. In FIG. 1, network 100 may be comprised of devices 101 that are interconnected. A device, such as one of devices 101, may be a hardware device that comprises hardware and, in some cases, software. In these illustrative examples, the operations, functions, and/or processes described as being performed by a device may be performed by the hardware and/or software within the device.

In one illustrative example, devices 101 may include computers and, in some cases, other hardware components. As used herein, a "computer" may be any type of programmable device configured to send and/or receive data over a communications channel. For example, a computer in devices 101 may take the form of a microcomputer, a desktop computer, a laptop computer, a tablet computer, a smartphone, a personal digital assistant (PDA), a workstation, a server computer, a Web server, a client computer, a mainframe computer, a supercomputer, a processor, a microprocessor, or some other type of data processing system.

Devices 101 may be configured to exchange data with each other using node network 102 within network 100. Node network 102 is formed by plurality of nodes 104 that are interconnected. As one illustrative example, one of devices 101 may send data to another one of devices 101 using at least a portion of plurality of nodes 104. The device sending the data may be referred to as the source device, while the device receiving the data may be referred to as the destination device. In some cases, a node in plurality of nodes 104 may be one of devices 101.

In these illustrative examples, data may be sent from a source device to a destination device across node network 102 in the form of data streams comprised of data packets. In one illustrative example, without limitation, number of source devices 105 may send input data streams into node network 102. Further, number of destination devices 106 may be configured to receive output data streams from node network 102.

As used herein, a "number of" items means one or more items. For example, number of source devices 105 may be one or more source devices. Further, number of destination devices 106 may be one or more destination devices.

As depicted, number of source devices 105 may include set of unsecure source devices 108 and number of secure source devices 109. Further, number of destination devices 106 may include set of unsecure destination devices 110 and number of secure destination devices 111. As used herein, a "set of" items may be zero or more items. In this manner, a set of items may be an empty or null set in some cases. For example, set of unsecure source devices 108 may be zero, one, two, four, or some other set of unsecure source devices 108.

An "unsecure source device", such as one of set of unsecure source devices 108, may be a device that is authorized to send data through node network 102 but that is not authorized to send data to one or more secure destination devices. The type of data sent from an unsecure source device may be "unsecure data packets". A "secure source device", such as one of number of secure source devices 109, may be a device that is both authorized to send data through node network 102 and authorized to send data to one or more secure destination devices. The type of data sent from a secure source device may be "secure data packets".

Further, an "unsecure destination device", such as one of set of unsecure destination devices 110, may be a device that is not authorized to receive secure data packets through node network 102. A "secure destination device", such as one of number of secure destination devices 111, may be a device that is authorized to receive secure data packets through node network 102. For example, without limitation, secure destination device may be a secure server, a secure end-node, a secure end-device, or a secure Web server.

In these illustrative examples, data packets may enter node network 102 through ingress node 112. These data packets may then be transmitted from ingress node 112 through set of nodes 114 to egress node 116. Data packets may leave node network 102 through egress node 116.

As one illustrative example, a source device in number of source devices 105 may send data packets into node network 102 through ingress node 112. These data packets may then be transmitted from ingress node 112 to egress node 116 through set of nodes 114. The data packets may then be sent to a destination device in number of destination devices 106 from egress node 116.

Node 120 is an example of one of plurality of nodes 104 in node network 102. Node 120 may be implemented such that node 120 may be capable of functioning as ingress node 112, one of set of nodes 114, and/or egress node 116.

As depicted, node 120 may include number of inputs 122, number of outputs 124, first networking device 126, second networking device 128, and timing controller 130. Number of inputs 122 may comprise any number of switches, buffers, and/or other types of hardware equipment and/or software configured to receive data. Number of outputs 124 may comprise any number of switches, buffers, and/or other types of hardware equipment and/or software configured to send data.

Further, first networking device 126 and second networking device 128 may comprise hardware equipment and/or software configured to process the data received by number of inputs 122 and send this data to number of outputs 124. First networking device 126 and second networking device 128 may have switching and/or routing capabilities. Timing controller 130 may be configured to control the receiving, processing, and sending of data to or from node 120 based on a specified timing.

Potential configurations for a node functioning as ingress node 112 are described in FIG. 2 below. Potential configurations for a node functioning as egress node 116 are described in FIG. 3 below.

Figure 2:
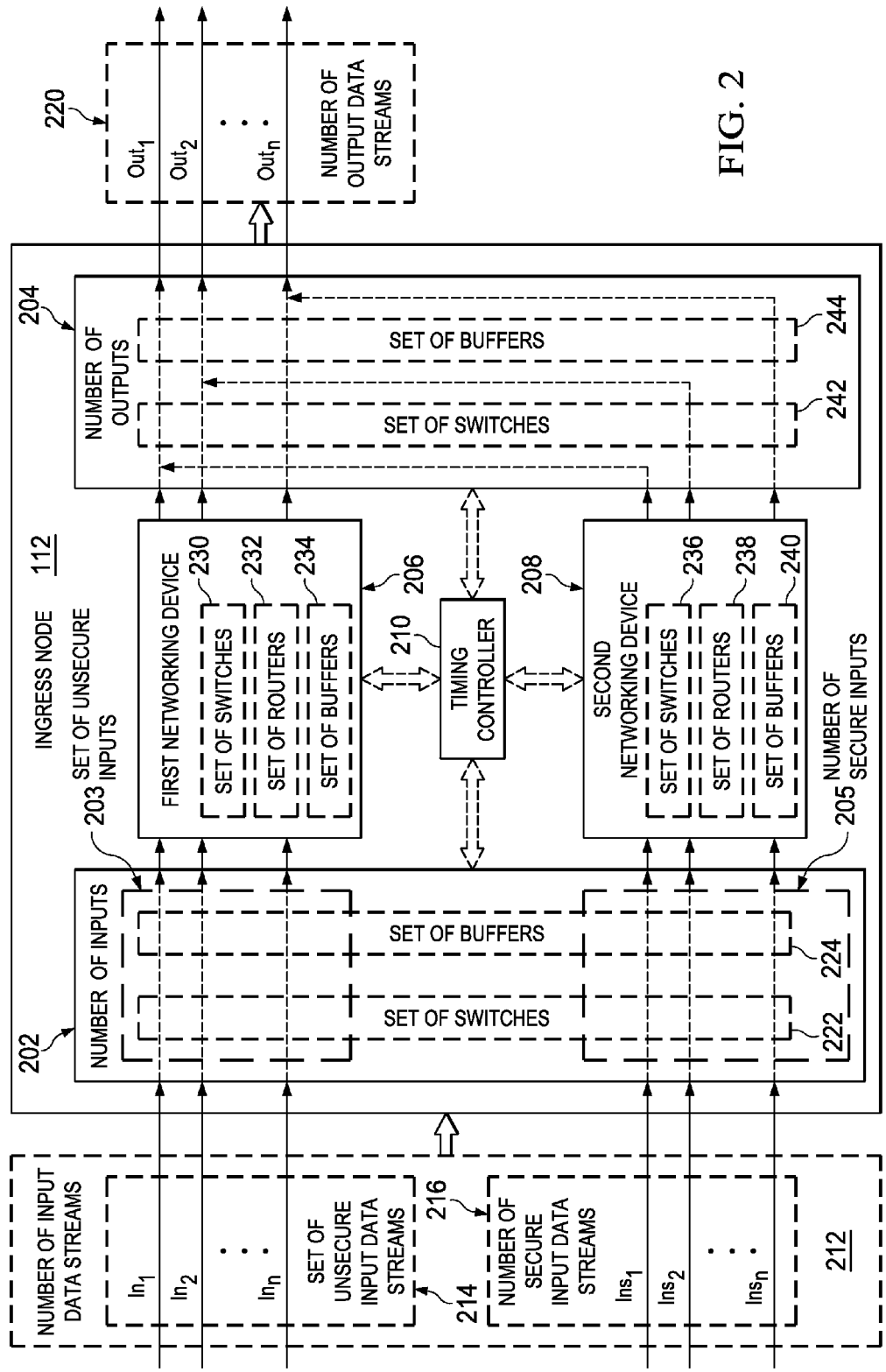
FIG. 2 is an illustration of an ingress node in the form of a block diagram in accordance with an illustrative embodiment.

With reference now to FIG. 2, an illustration of an ingress node in the form of a block diagram is depicted in accordance with an illustrative embodiment. As depicted, ingress node 112 includes number of inputs 202, number of outputs 204, first networking device 206, second networking device 208, and timing controller 210.

In this illustrative example, number of inputs 202 may be configured to receive number of input data streams 212 from number of source devices 105 in FIG. 1. Number of inputs 202 may include set of unsecure inputs 203 and number of secure inputs 205. These inputs may be, for example, ports. An unsecure input is an input that has not been designated to receive secure data packets. A secure input is an input that has been designated to receive secure data packets. In some cases, a secure input may be designated to only receive secure data packets. However, in other examples, a secure input may be designated to receive a combination of both secure data packets and unsecure data packets.

As depicted, set of unsecure inputs 203 is configured to receive set of unsecure input data streams 214 and number of secure inputs 205 is configured to receive number of secure input data streams 216. Each of set of unsecure input data streams 214 may be comprised of unsecure data packets, while each of number of secure input data streams 216 may be comprised of secure data packets. Ingress node 112 may be configured to receive number of input data streams 212, process the data packets in number of input data streams 212, and send out these data packets in the form of number of output data streams 220.

As depicted, number of inputs 202 may include set of switches 222 and set of buffers 224 in any order. Set of unsecure inputs 203 may process set of unsecure input data streams 214 using at least a portion of set of switches 222 and set of buffers 224 in any order and send the unsecure data packets in set of unsecure input data streams 214 to first networking device 206. Further, number of secure inputs 205 may process number of secure input data streams 216 using at least a portion of set of switches 222 and set of buffers 224 in any order and send the secure data packets in number of secure input data streams 216 to second networking device 208.

In some cases, the portion of set of switches 222 used to send the secure data packets to second networking device 208 may be controlled by timing controller 210. Timing controller 210 may determine when each of these secure data packets is to be sent to number of outputs 204.

In this illustrative example, first networking device 206 may comprise set of switches 230, set of routers 232, set of buffers 234, and/or other types of hardware and/or software equipment. Further, second networking device 208 may comprise set of switches 236, set of routers 238, set of buffers 240, and/or other types of hardware and/or software equipment. Timing controller 210 may control first networking device 206 and/or second networking device 208 depending on the implementation. Timing controller 210 may determine the times at which unsecure data packets and secure data packets are to be sent to number of outputs 204.

As depicted, number of outputs 204 may include set of switches 242 and set of buffers 244 in any order. Number of outputs 204 may be configured to integrate the unsecure data packets received from first networking device 206 and the secure data packets received from second networking device 208 to form number of output data streams 220. In particular, timing controller 210 may determine the times at which each of the secure data packets is inserted into an output data stream in number of output data streams 220. Number of outputs 204 may send number of output data streams to a number of next nodes within node network 102 in FIG. 1.

Figure 3:
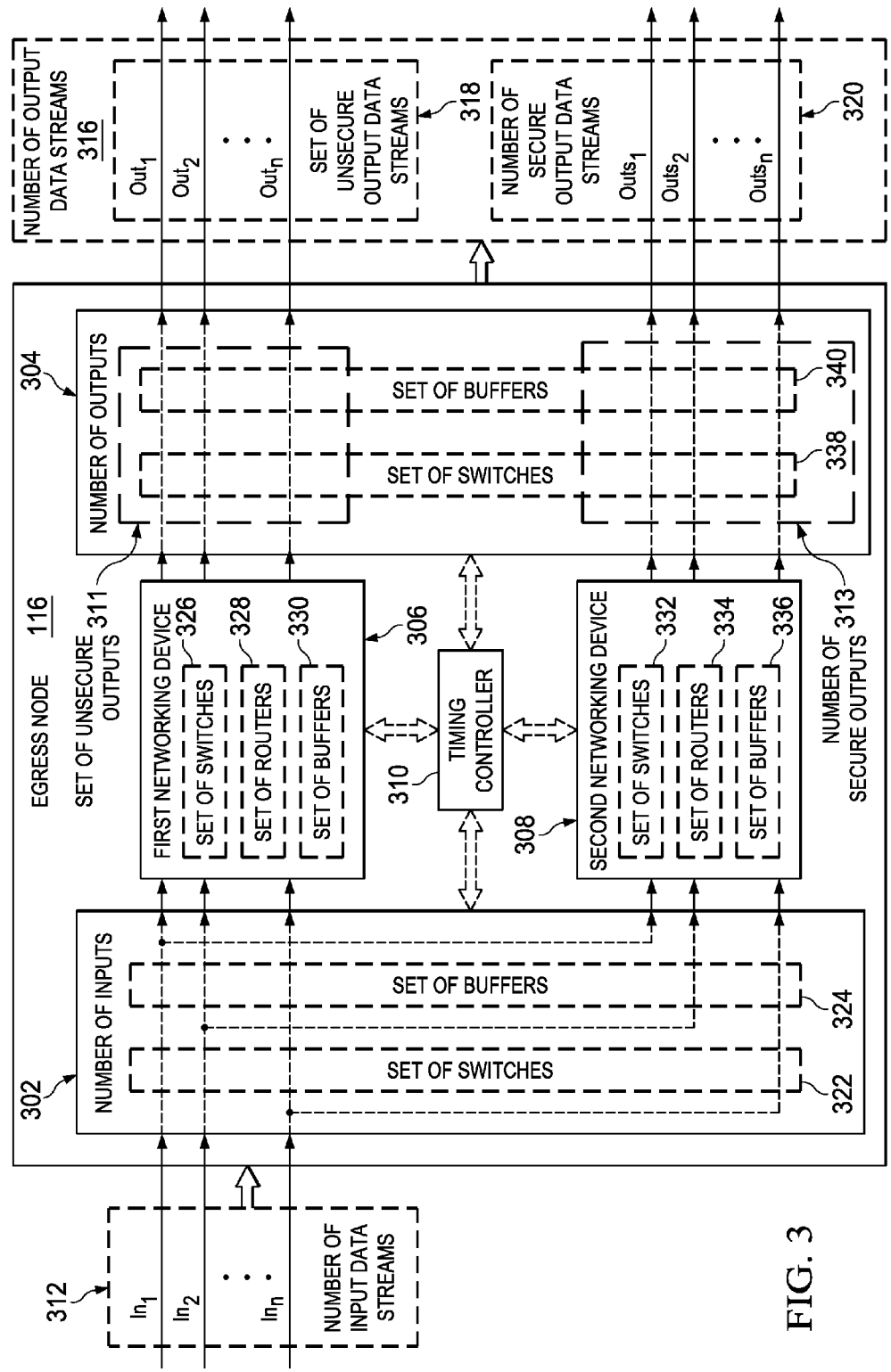
FIG. 3 is an illustration of an egress node in the form of a block diagram in accordance with an illustrative embodiment.

With reference now to FIG. 3, an illustration of an egress node in the form of a block diagram is depicted in accordance with an illustrative embodiment. As depicted, egress node 116 includes number of inputs 302, number of outputs 304, first networking device 306, second networking device 308, and timing controller 310.

In this illustrative example, number of inputs 302 may be configured to receive number of input data streams 312 from a number of previous nodes in node network 102 in FIG. 1. Egress node 116 may be configured to receive number of input data streams 312, process the data packets in number of input data streams 312, and send out these data packets to number of destination devices 106 in FIG. 1 in the form of number of output data streams 316.

Number of output data streams 316 may include set of unsecure output data streams 318 and number of secure output data streams 320. Each of set of unsecure output data streams 318 may be comprised of unsecure data packets, while each of number of secure output data streams 320 may be comprised of secure data packets.

As depicted, number of inputs 302 may include set of switches 322 and set of buffers 324 in any order. Number of inputs 302 may process number of input data streams 312 using set of switches 322 and set of buffers 324. Number of inputs 302 may send the unsecure data packets in number of input data streams 312 to first networking device 306. Further, number of inputs 302 may send the secure data packets in number of input data streams 312 to second networking device 308.

In some cases, set of switches 322 may be controlled by timing controller 310. Timing controller 310 may use the times at which each data packet is received at number of inputs 302 to determine whether the data packet is a secure data packet or an unsecure data packet. For example, a data packet may be identified as a secure data packet based on the specific time the data packet was received based on a predetermined schedule.

In this illustrative example, first networking device 306 may comprise set of switches 326, set of routers 328, set of buffers 330, and/or other types of hardware equipment and/or software. Further, second networking device 308 may comprise set of switches 332, set of routers 334, set of buffers 336, and/or other types of hardware equipment and/or software. Timing controller 310 may control first networking device 306 and/or second networking device 308 depending on the implementation. Timing controller 310 may determine the times at which unsecure data packets and secure data packets are to be sent to number of outputs 304.

Number of outputs 304 may include set of unsecure outputs 311 and number of secure outputs 313. These outputs may be, for example, ports. An unsecure output is an output that has not been designated to send out secure data packets. A secure output is an output that has been designated to send out secure data packets. In some cases, a secure output may be designated to only send out secure data packets. However, in other examples, a secure output may be designated to send out a combination of both secure data packets and unsecure data packets.

As depicted, number of outputs 304 may include set of switches 338 and set of buffers 340 in any order. Set of unsecure outputs 311 may be configured to send the unsecure data packets to set of unsecure destination devices 110 in FIG. 1 in the form of set of unsecure output data streams 318. Further, number of secure outputs 313 may be configured to send the secure data packets to number of secure destination devices 111 in FIG. 1 in the form of number of secure output data streams 320.

In this manner, egress node 116 may separate secure data packets from unsecure data packets and may ensure that only secure data packets are sent to number of secure destination devices 111 in FIG. 1. Egress node 116 may ensure that unsecure data packets do not reach number of secure destination devices 111 in FIG. 1.

The illustrations of network 100 in FIG. 1, ingress node 112 in FIG. 2, and egress node 116 in FIG. 3 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 4:
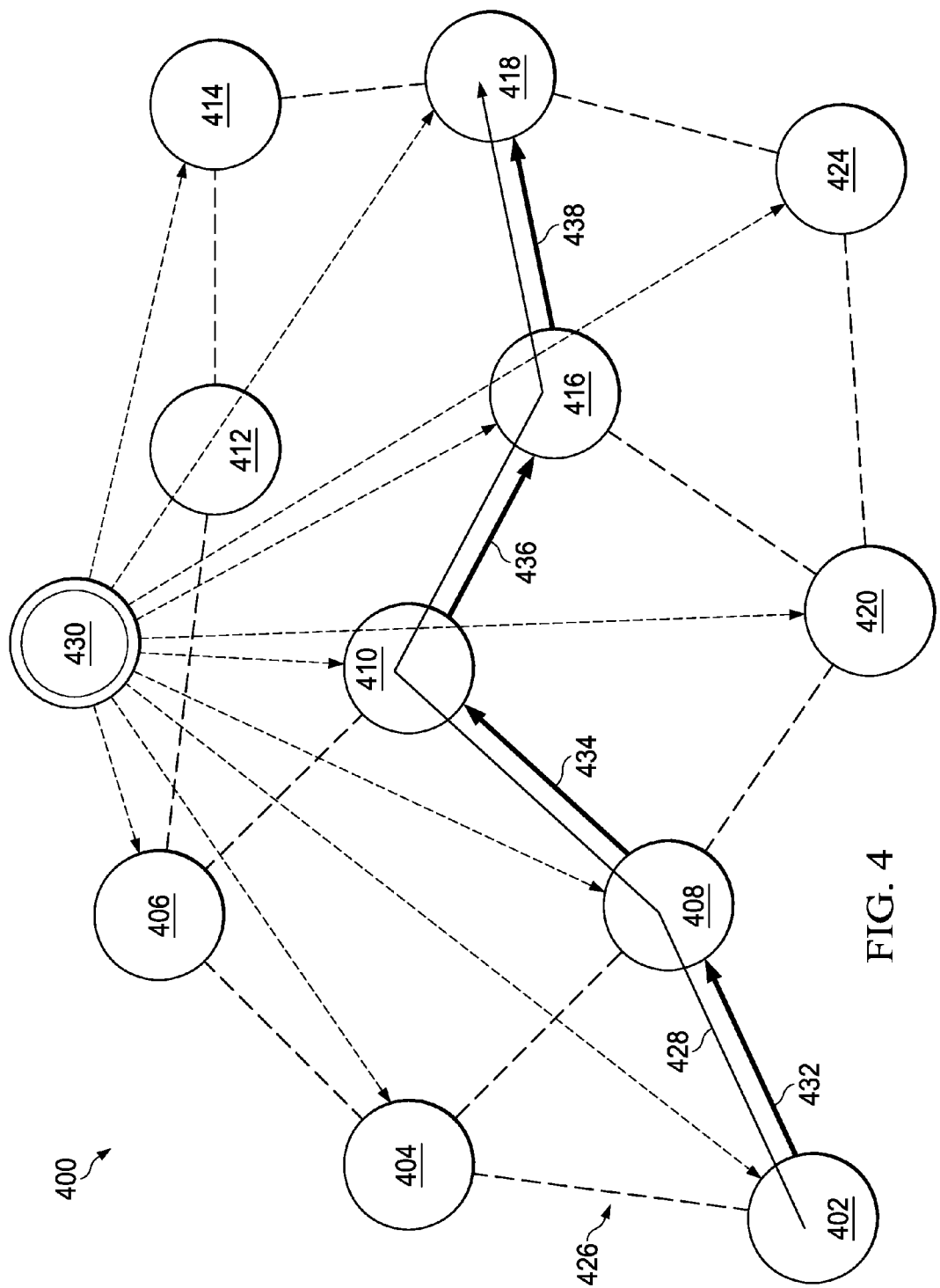
FIG. 4 is an illustration of a node network in accordance with an illustrative embodiment.

With reference now to FIG. 4, an illustration of a node network is depicted in accordance with an illustrative embodiment. In FIG. 4, node network 400 may be an example of one implementation for node network 102 in FIG. 1. As depicted, node network 400 includes nodes 402, 404, 406, 408, 410, 412, 414, 416, 418, 420, and 424. These nodes may be configured to communicate using communications links 426. Communications links 426 may include, for example, any number of wireless communications links, wired communications links, optical communications links, and/or other types of communications links.

In this illustrative example, node pathway 428 may be a pathway through node network 400 that has been preselected for use in sending data through node network 400. Node pathway 428 includes node 402, node 408, node 410, node 416, and node 418 in this example. Node 402 may be the ingress node in node pathway 428, while node 418 may be the egress node in node pathway 428.

Data may be sent along node pathway 428 based on a predetermined schedule. For example, without limitation, the different nodes in node network 400 may all be configured to receive timing signals from clock 430. Clock 430 may be, for example, without limitation, a satellite clock, a global positioning system satellite clock, or some other type of clock either common, coupled, or separate and/or either in-band or out-of-band.

Each node along node pathway 428 may be configured to use the timing signals received from clock 430 to determine the specific times at which secure data packets are to be received and sent from each node. Further, each node along node pathway 428 may be configured to take into account the propagation delay between nodes. For example, without limitation, propagation delays 432, 434, 436, and 438 may be taken into account when determining the times at which each node along node pathway 428 is scheduled to receive secure data packets and send out secure data packets.

Figure 5:
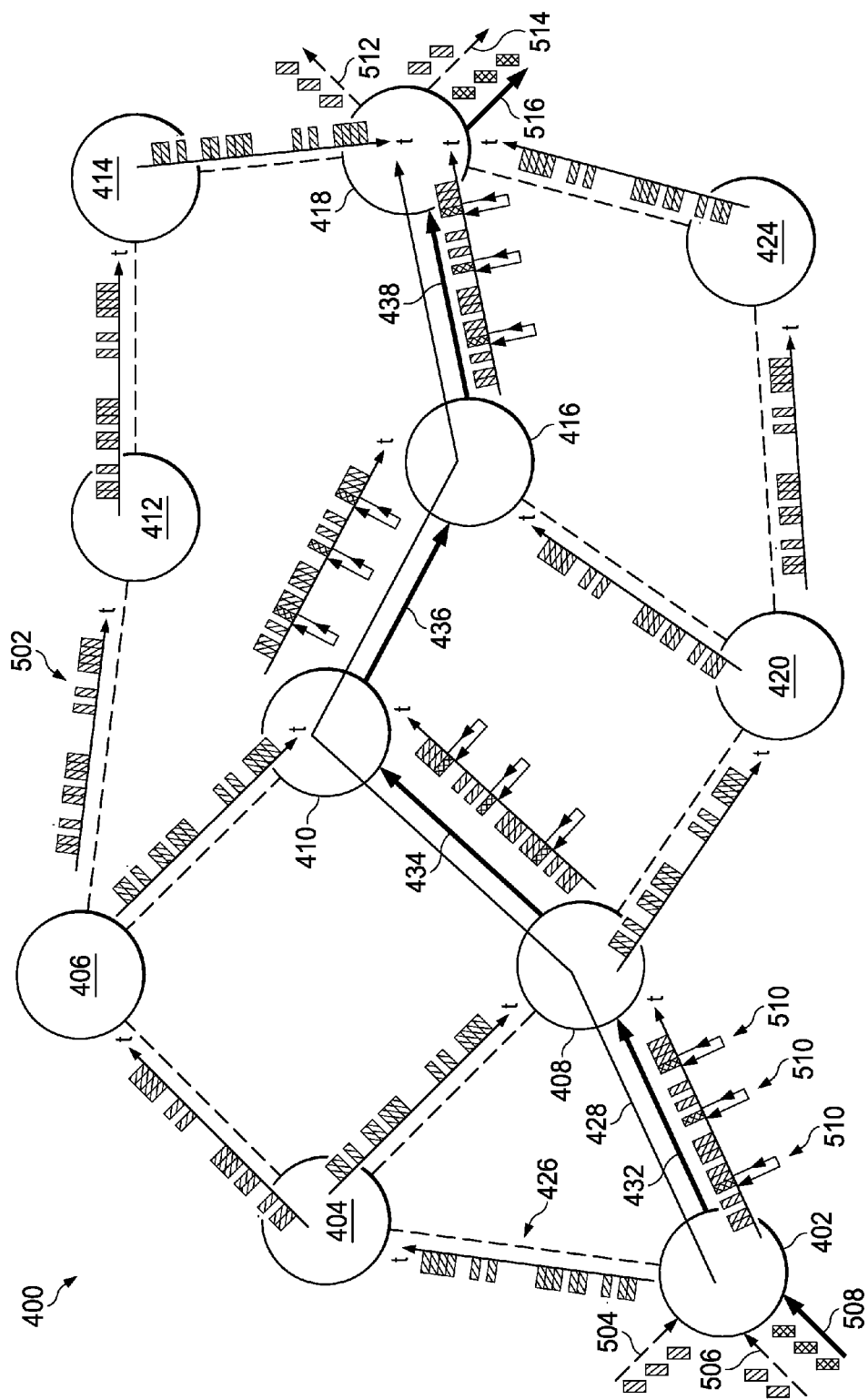
FIG. 5 is an illustration of data packets being exchanged across a node network in accordance with an illustrative embodiment.

With reference now to FIG. 5, an illustration of data packets being exchanged across a node network is depicted in accordance with an illustrative embodiment. In this illustrative example, data packets 502 are being exchanged across node network 400 from FIG. 4. Secure data packets may be authorized to be transmitted across node network 400 along node pathway 428.

As the ingress node, node 402 may receive unsecure input data stream 504, unsecure input data stream 506, and secure input data stream 508. These input data streams may be configured to be sent through node network 400 along node pathway 428. Unsecure input data stream 504 and unsecure input data stream 506 may be received from unsecure source devices. However, secure input data stream 508 may be received from a secure source device. The secure data packets in secure input data stream 508 may be configured to be sent through node network 400 along node pathway 428 at scheduled time slots 510.

As the egress node, node 418 may send out unsecure output data stream 512, unsecure output data stream 514, and secure output data stream 516. Unsecure output data stream 512 and unsecure output data stream 514 may be sent to unsecure destination devices. However, secure output data stream 516 may be sent to a secure destination device. Secure output data stream 516 comprises the secure data packets received in secure input data stream 508 at node 402. Node 418 is configured to ensure that only secure data packets and not unsecure data packets reach secure destination devices.

Figure 6:
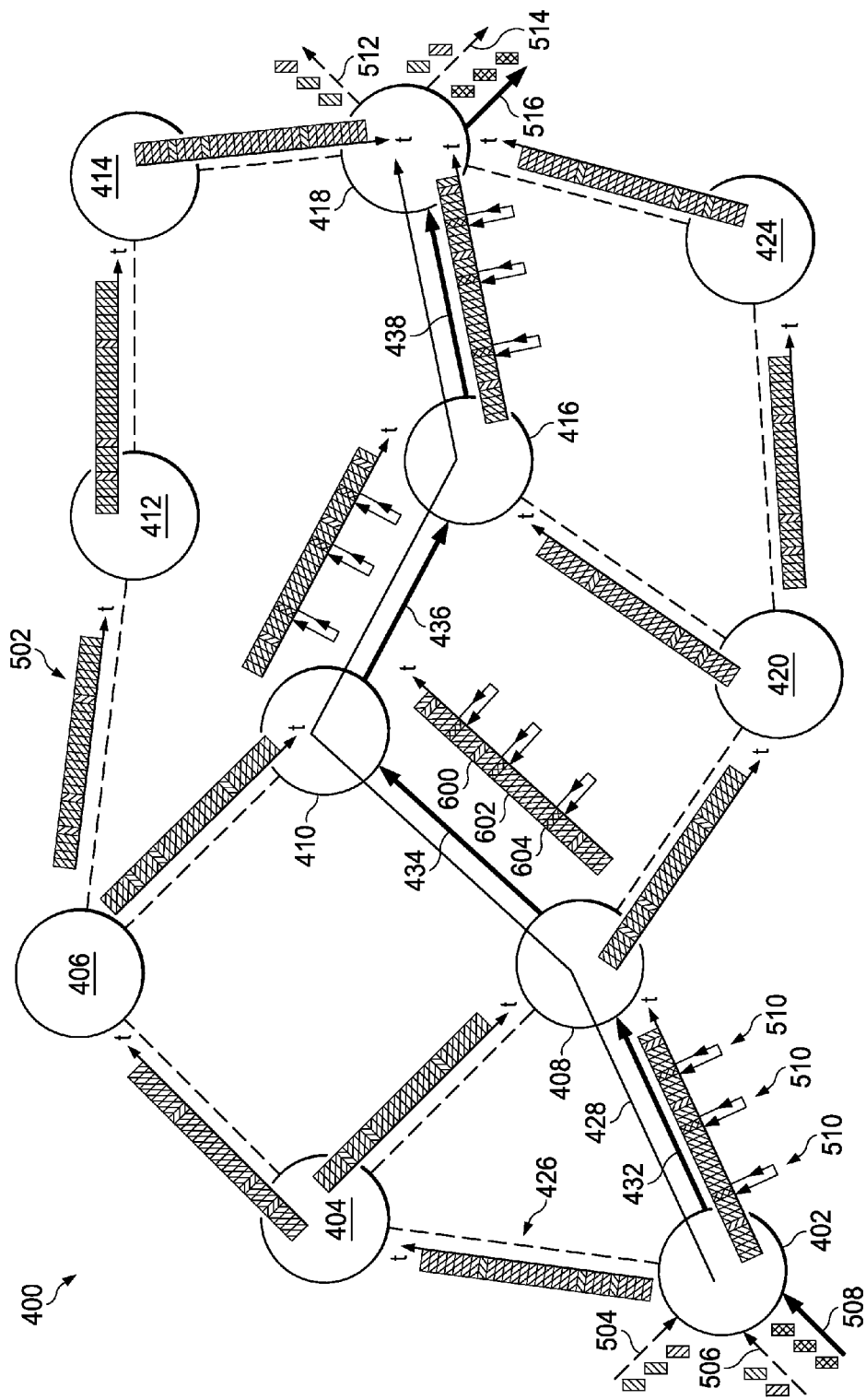
FIG. 6 is an illustration of data packets being exchanged across a node network in accordance with an illustrative embodiment.

With reference now to FIG. 6, an illustration of data packets being exchanged across a node network is depicted in accordance with an illustrative embodiment. In this illustrative example, data packets 502 being exchanged across node network 400 from FIGS. 4-5 may include unsecure authorized data packets 600, unsecure unauthorized data packets 602, and secure data packets 604.

Unsecure authorized data packets 600 may include data packets that may have been authorized for transmission through node network 400 but that have not been authorized to be sent to any secure destination devices. Unsecure unauthorized data packets 602 may include data packets that may not have been authorized for transmission through node network 400 and that have not been authorized to be sent to any secure destination devices. Unsecure unauthorized data packets 602 may pose information security issues and/or undesired inconsistency issues. Secure data packets 604 may include data packets that may have been authorized for transmission through node network 400 and that have been authorized to be sent to one or more secure destination devices.

The predetermined schedule established for the transmission of data packets along node pathway 428 may ensure that only secure data packets are sent to secure destination devices. For example, secure output data stream 516 sent out by node 418 may not include any unsecure authorized data packets or any unsecure unauthorized data packets.

Figure 7:
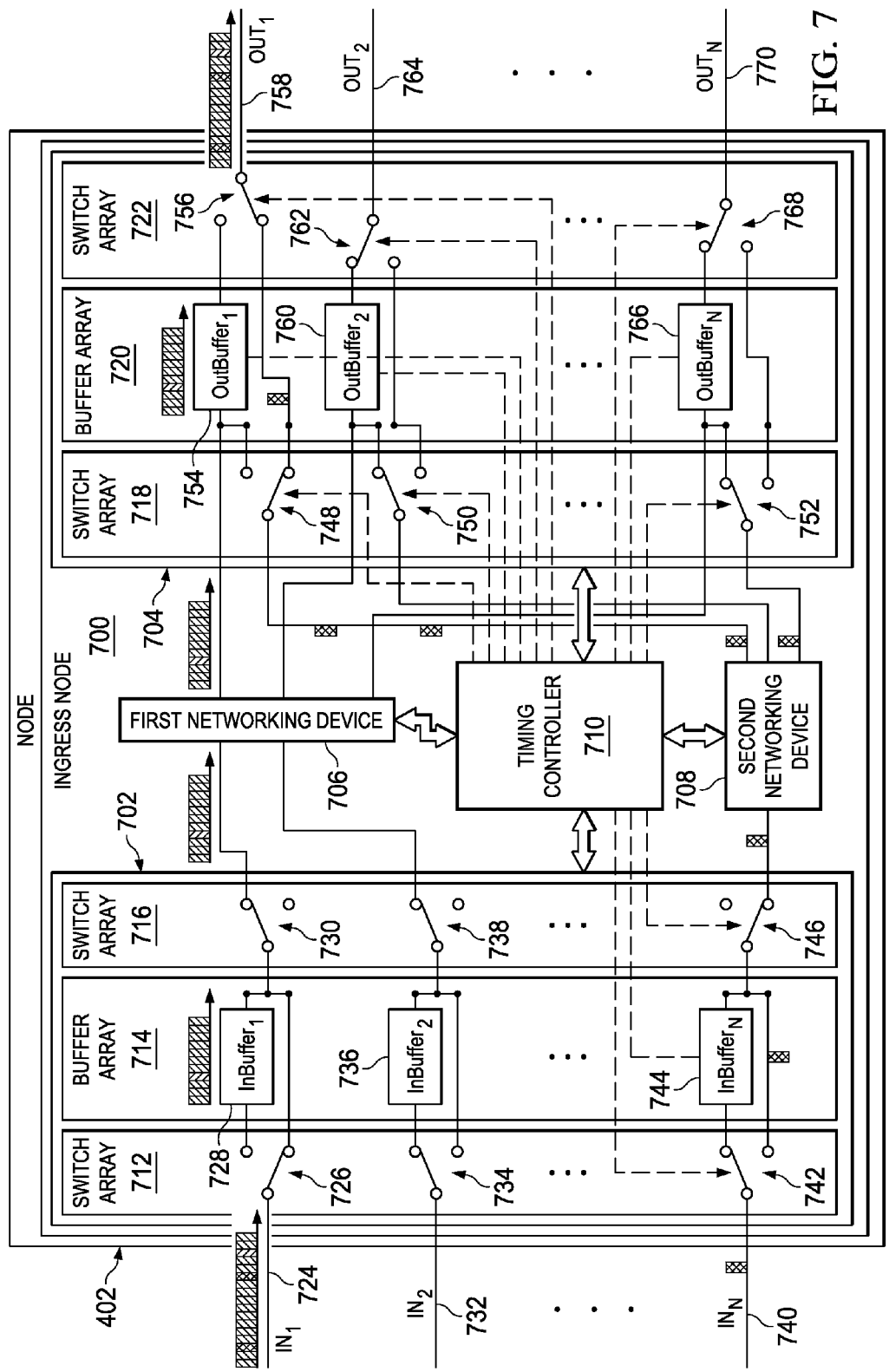
FIG. 7 is an illustration of a node functioning as an ingress node is in accordance with an illustrative embodiment.

With reference now to FIG. 7, an illustration of a node functioning as an ingress node is depicted in accordance with an illustrative embodiment. As depicted, node 402 from FIGS. 4-6 may function as ingress node 700. Ingress node 700 may be an example of one implementation for ingress node 112 in FIG. 2.

Ingress node 700 may include number of inputs 702, number of outputs 704, first networking device 706, second networking device 708, and timing controller 710. Number of inputs 702 includes switch array 712, buffer array 714, and switch array 716. Number of outputs 704 includes switch array 718, buffer array 720, and switch array 722.

In this illustrative example, an unsecure input in number of inputs 702 receives unsecure input data stream 724. In particular, this unsecure input processes unsecure input data stream 724 using switch 726 in switch array 712, buffer 728 in buffer array 714, and switch 730 in switch array 716. Further, another unsecure input in number of inputs 702 receives unsecure input data stream 732. This other unsecure input processes unsecure input data stream 732 using switch 734 in switch array 712, buffer 736 in buffer array 714, and switch 738 in switch array 716.

These two unsecure inputs send the unsecure data packets in unsecure input data stream 724 and in unsecure input data stream 732 to first networking device 706. In this illustrative example, timing controller 710 does not control the times at which these unsecure inputs send unsecure data packets to first networking device 706.

Further, a secure input in number of inputs 702 receives secure input data stream 740. This secure input processes secure input data stream 740 using switch 742 in switch array 712, buffer 744 in buffer array 714, and switch 746 in switch array 716. In this illustrative example, switch 742, buffer 744, and switch 746 may be controlled by timing controller 710.

Timing controller 710 may determine the times at which secure data packets in secure input data stream 740 are sent from the secure input to second networking device 708. Further, timing controller 710 determines when second networking device 708 is to send a secure data packet to each of switch 748, switch 750, and switch 752 in switch array 718 in number of outputs 704. These switches also may be controlled by timing controller 710.

An output in number of outputs 704 uses switch 748, buffer 754 in buffer array 720, and switch 756 in switch array 722 to form output data stream 758. In particular, a portion of the unsecure data packets processed by first networking device 706 may be sent into buffer 754. Timing controller 710 may control switch 748, switch 756, first networking device 706, and second networking device 708 to determine when unsecure data packets and when secure data packets are put into output data stream 758.

Similarly, another output in number of outputs 704 uses switch 750, buffer 760 in buffer array 720, and switch 762 in switch array 722 to form output data stream 764. In particular, a portion of the unsecure data packets processed by first networking device 706 may be sent into buffer 760. Timing controller 710 may control switch 750, switch 762, first networking device 706, and second networking device 708 to determine when unsecure data packets and when secure data packets are put into output data stream 764.

Yet another output in number of outputs 704 uses switch 752, buffer 766 in buffer array 720, and switch 768 in switch array 722 to form output data stream 770. In particular, a portion of the unsecure data packets processed by first networking device 706 may be sent into buffer 766. Timing controller 710 may control switch 752, switch 768, first networking device 706, and second networking device 708 to determine when unsecure data packets and when secure data packets are put into output data stream 770.

Figure 8:
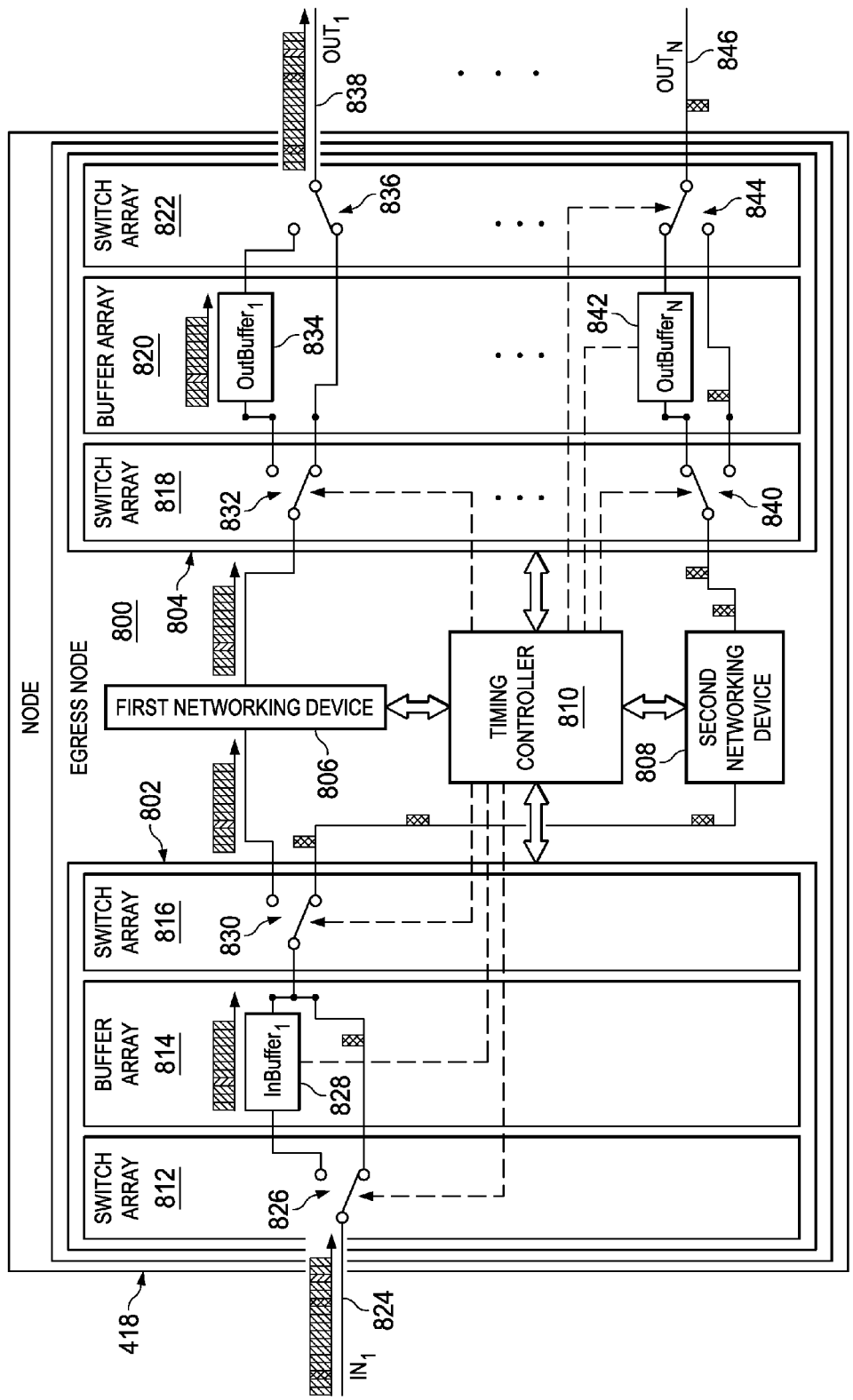
FIG. 8 is an illustration of a node functioning as an egress node is in accordance with an illustrative embodiment.

With reference now to FIG. 8, an illustration of a node functioning as an egress node is depicted in accordance with an illustrative embodiment. As depicted, node 418 from FIGS. 4-6 may function as egress node 800. Egress node 800 may be an example of one implementation for egress node 116 in FIG. 3. Egress node 800 may include number of inputs 802, number of outputs 804, first networking device 806, second networking device 808, and timing controller 810.

In this illustrative example, number of inputs 802 includes switch array 812, buffer array 814, and switch array 816. Number of outputs 804 includes switch array 818, buffer array 820, and switch array 822.

As depicted, an input in number of inputs 802 is configured to receive input data stream 824. This input processes input data stream 824 using switch 826 in switch array 812, buffer 828 in buffer array 814, and switch 830 in switch array 816. Timing controller 810 may control switch 826 and switch 830. In particular, timing controller 810 may be used to determine which data packets in input data stream 824 are secure data packets and which data packets are unsecure data packets based on the times at which these data packets are received at the input.

The input sends the unsecure data packets to first networking device 806. First networking device 806 sends the unsecure data packets to an unsecure output in number of outputs 804. In this illustrative example, the unsecure output processes the unsecure data packets using switch 832 in switch array 818, buffer 834 in buffer array 820, and switch 836 in switch array 822. The unsecure output forms unsecure output data stream 838 using these unsecure data packets. In this illustrative example, unsecure output data stream 838 does not include any secure data packets. Unsecure output data stream 838 may be sent out to an unsecure destination device.

Further, the input sends the secure data packets to second networking device 808. Second networking device 808 sends the secure data packets to a secure output in number of outputs 804. The secure output processes these secure data packets using switch 840 in switch array 818, buffer 842 in buffer array 820, and switch 844 in switch array 822. The secure output forms secure output data stream 846 using the secure data packets. In this illustrative example, secure output data stream 846 does not include any unsecure data packets. The secure output may send secure output data stream 846 to a secure destination device.

Figure 9:
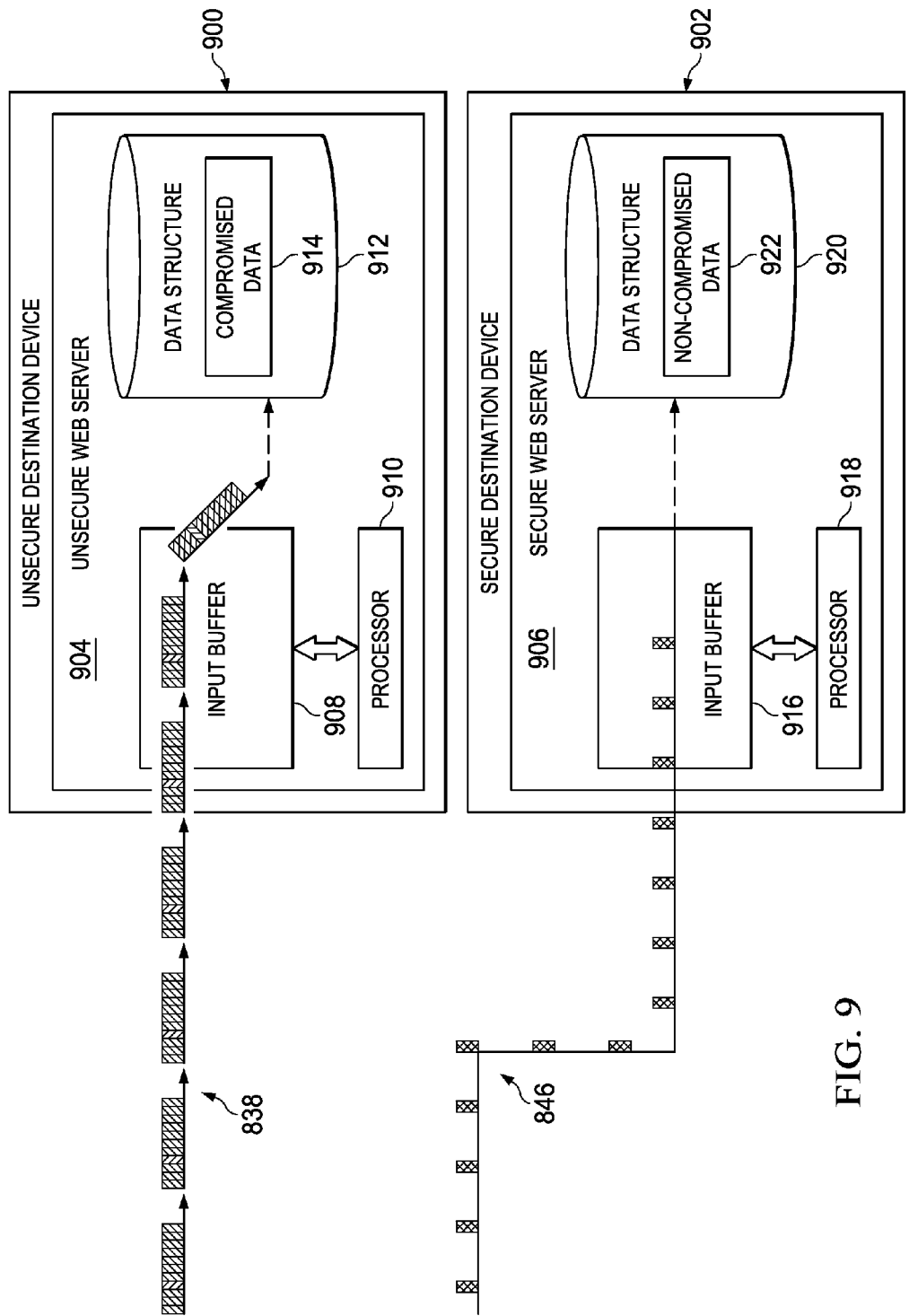
FIG. 9 is an illustration of output data streams being sent to destination devices in accordance with an illustrative embodiment.

With reference now to FIG. 9, an illustration of output data streams being sent to destination devices is depicted in accordance with an illustrative embodiment. In this illustrative example, unsecure output data stream 838 from FIG. 8 may be sent to unsecure destination device 900, while secure output data stream 846 may be sent to secure destination device 902.

As depicted, unsecure destination device 900 takes the form of unsecure web server 904, while secure destination device 902 takes the form of secure web server 906. Unsecure web server 904 includes input buffer 908, processor 910, and data structure 912.

Input buffer 908 is configured to receive the unsecure data packets in unsecure output data stream 838 and store these unsecure data packets in data structure 912. Unsecure output data stream 838 may include unsecure authorized data packets and/or unsecure unauthorized data packets. These unsecure data packets in unsecure output stream 838 may have undesired inconsistencies which may cause for example, without limitation, buffer overflow, denial of service events, server crashes, and/or other undesired events. Because these unsecure data packets in unsecure output stream 838 are sent to unsecure destination device 900, the undesired inconsistencies and/or other undesired events will occur in unsecure destination device 900. Consequently, the data stored in data structure 912 may be considered compromised data 914.

Secure web server 906 may include input buffer 916, processor 918, and data structure 920. Input buffer 916 is configured to receive the secure data packets in secure output data stream 846 and store these secure data packets in data structure 920. Because secure output data stream 846 does not include any unsecure data packets, the data stored in data structure 920 may be considered non-compromised data 922. Because secure output data stream 846 only includes secure data packets, undesired inconsistencies such as, for example, without limitation, buffer overflow, denial of service events, server crashes, and/or other undesired events may not occur in secure destination device 902.

The illustrations of node network 400 in FIGS. 4-6, ingress node 700 in FIG. 7, egress node 800 in FIG. 8, and unsecure destination device 900 and secure destination device 902 in FIG. 9 are not meant to imply physical or architectural limitations to the manner in which an illustrative embodiment may be implemented. Other components in addition to or in place of the ones illustrated may be used. Some components may be optional.

The different components shown in FIGS. 4-9 may be illustrative examples of how components shown in block form in FIGS. 1-3 may be implemented as physical structures. Additionally, the components shown in FIGS. 4-9 may be combined with components in FIG. 1, used with components in FIG. 1, or a combination of the two.

Figure 10:
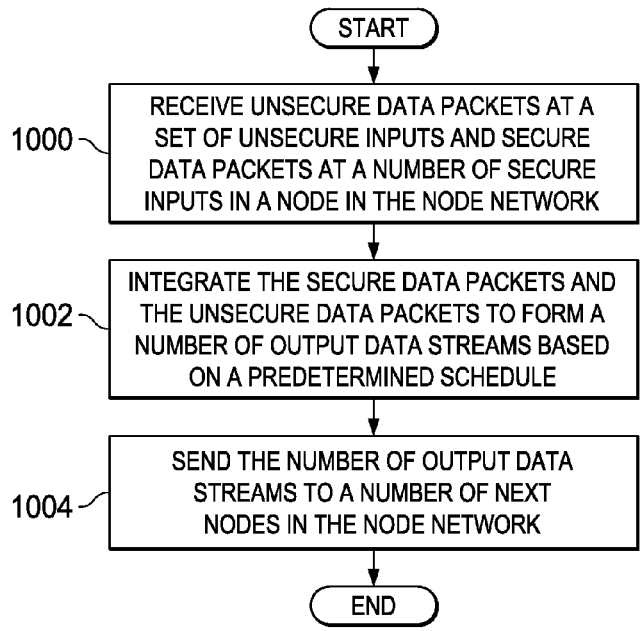
FIG. 10 is an illustration of a process for transmitting secure data packets through a node network in the form of a flowchart, in accordance with an illustrative embodiment.

With reference now to FIG. 10, an illustration of a process for transmitting secure data packets through a node network in the form of a flowchart is depicted in accordance with an illustrative embodiment. The process illustrated in FIG. 10 may be implemented by, for example, without limitation, ingress node 112 in FIG. 2.

The process may begin by receiving unsecure data packets at a set of unsecure inputs and secure data packets at a number of secure inputs in a node in the node network (operation 1000). The secure data packets may be authorized to be sent to a number of secure destination devices. However, the unsecure data packets may not be authorized to be sent to the number of secure destination devices.

Thereafter, the secure data packets and the unsecure data packets may be integrated to form a number of output data streams based on a predetermined schedule (operation 1002). The number of output data streams may then be sent to a number of next nodes in the node network (1004), with the process terminating thereafter.

Figure 11:
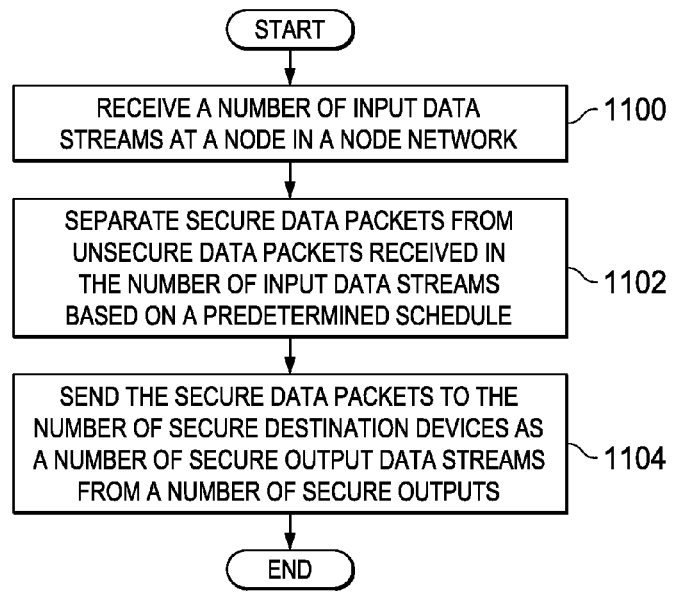
FIG. 11 is an illustration of a process for transmitting secure data packets to a number of secure destination devices in the form of a flowchart in accordance with an illustrative embodiment.

With reference now to FIG. 11, an illustration of a process for transmitting secure data packets to a number of secure destination devices in the form of: a flowchart is depicted in accordance with an illustrative embodiment. The process illustrated in FIG. 11 may be implemented by, for example, without limitation, egress node 116 in FIG. 3.

The process may begin by receiving a number of input data streams at a node in a node network (operation 1100). Thereafter, secure data packets may be separated from unsecure data packets received in the number of input data streams based on a predetermined schedule (operation 1102). The secure data packets may be authorized to be sent to a number of secure destination devices. However, the unsecure data packets may not be authorized to be sent to the number of secure destination devices.

The secure data packets may then be sent to the number of secure destination devices as a number of secure output data streams from a number of secure outputs (1104), with the process terminating thereafter. Further, in operation 1104, the set of unsecure data packets may be sent to a set of unsecure destination devices as a set of unsecure output data streams.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 12:
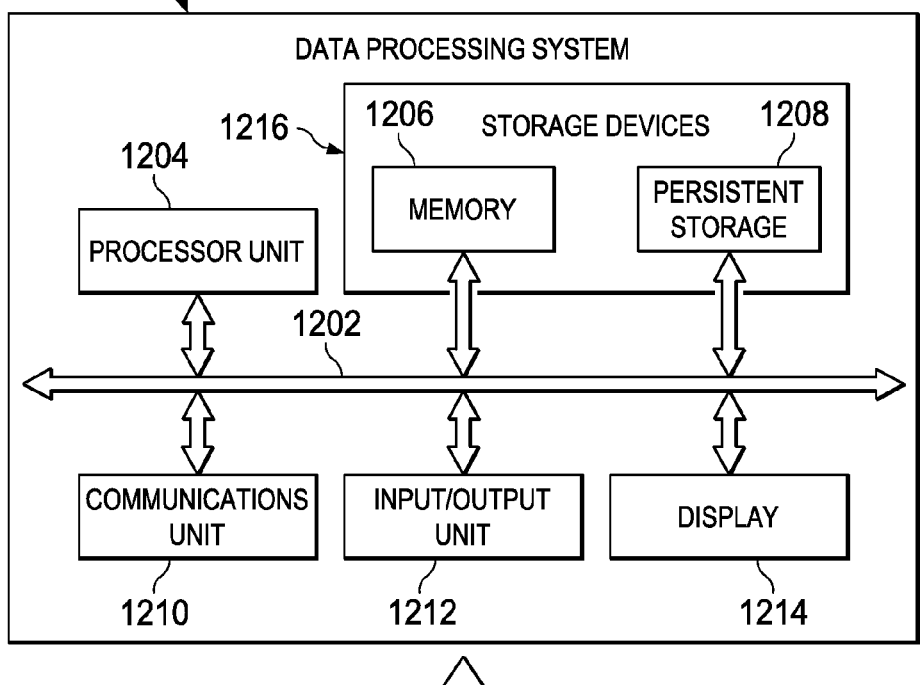
FIG. 12 is an illustration of a data processing system in the form of a block diagram in accordance with an illustrative embodiment.
Figure 12:
Figure 12:
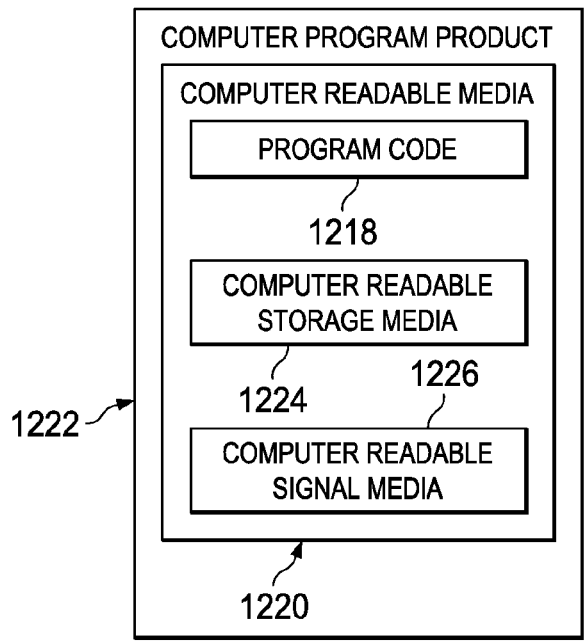

Turning now to FIG. 12, an illustration of a data processing system in the form of a block diagram is depicted in accordance with an illustrative embodiment. In this illustrative example, data processing system 1200 may be used to implement any one of number of source devices 105, plurality of nodes 104, and/or number of destination devices 106 in devices 101 in FIG. 1. Further, data processing system 1200 may be used to implement any component within a node in plurality of nodes 104.

In this illustrative example, data processing system 1200 includes communications framework 1202, which provides communications between processor unit 1204, memory 1206, persistent storage 1208, communications unit 1210, input/output unit 1212, and display 1214. Communications framework 1202 may be implemented as a bus system in some examples.

Processor unit 1204 serves to execute instructions for software that is loaded into memory 1206 to perform a number of operations. Processor unit 1204 may be a number of processors, a multi-processor core, or some other type of processor, depending on the particular implementation. In some cases, processor unit 1204 may take the form of a hardware unit, such as a circuit system, an application specific integrated circuit (ASIC), a programmable logic device, or some other suitable type of hardware.

Memory 1206 and persistent storage 1208 are examples of storage devices 1216. Storage devices 1216 may be in communication with processor unit 1204 through communications framework 1202. A storage device, also referred to as a computer readable storage device, is any piece of hardware capable of storing information such as, for example, without limitation, data, program code in functional form, and/or other suitable information either on a temporary basis and/or a permanent basis. Memory 1206 may be, for example, a random access memory or any other suitable volatile or non-volatile storage device.

Persistent storage 1208 may take various forms and comprise any number of components or devices, depending on the particular implementation. For example, persistent storage 1208 may be a hard drive, a flash memory, a rewritable optical disk, a rewritable magnetic tape, or some combination of the above. Depending on the implementation, the media used by persistent storage 1208 may or may not be removable.

Communications unit 1210, in these examples, provides for communications with other data processing systems or devices. Communications unit 1210 may provide communications through the use of either or both physical and wireless communications links.

Input/output unit 1212 allows for input and output of data with other devices that may be connected to data processing system 1200. For example, input/output unit 1212 may provide a connection for user input through a keyboard, a mouse, and/or some other suitable input device and/or may send output to a printer. Display 1214 provides a mechanism to display information to a user.

Instructions for the operating system, applications, and/or programs may be located in storage devices 1216. The processes of the different embodiments may be performed by processor unit 1204 using computer-implemented instructions. These instructions are referred to as program code, computer usable program code, or computer readable program code and may be read and executed by one or more processors in processor unit 1204.

In these examples, program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these examples. Computer readable media 1220 may take the form of computer readable storage media 1224 or computer readable signal media 1226.

Computer readable storage media 1224 is a physical or tangible storage device used to store program code 1218 rather than a medium that propagates or transmits program code 1218. Computer readable storage media 1224 may take the form of, for example, without limitation, an optical or magnetic disk or a persistent storage device that is connected to data processing system 1200.

Alternatively, program code 1218 may be transferred to data processing system 1200 using computer readable signal media 1226. Computer readable signal media 1226 may be, for example, without limitation, a propagated data signal containing program code 1218. This data signal may be an electromagnetic signal, an optical signal, and/or some other suitable type of signal that may be transmitted over communications links that are physical, optical, and/or wireless.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

Thus, the illustrative embodiments provide configurations for nodes in a node network that allow secure data packets to be sent to secure destination devices. Using the node network described by the illustrative embodiments, the possibility of undesired inconsistencies occurring during the transmission of data through the node network may be reduced to within selected tolerances.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for transmitting secure data packets through a node network, the method comprising:

establishing a predetermined schedule that identifies specific times at which each node in the node network along a predetermined pathway through the node network transmits secure data packets along the predetermined node pathway through the node network and specific times at which secure data packets transmitted along the predetermined node pathway are received at each node in the node network, wherein propagation delays between nodes along the predetermined node pathway are taken into account when determining the times at which each node along the node pathways is scheduled to receive the secure data packets, and wherein the each node transmits the secure data packets based on the predetermined schedule;

receiving unsecure data packets at a set of unsecure inputs and the secure data packets at a number of secure inputs in a node in the node network,
wherein the secure data packets are authorized to be sent to a number of secure destination devices, and wherein the unsecure data packets are not authorized to be sent to the number of secure destination devices;

integrating the secure data packets and the unsecure data packets to form an output data stream based on the predetermined schedule;

sending the output data stream comprising the secure data packets and the unsecure data packets to a next node in along the predetermined node pathway until the secure data packets reach the egress node.

2. The method of claim 1, wherein the step of integrating the secure data packets and the unsecure data packets to form the output data stream based on the predetermined schedule comprises:

forming the output data stream using the unsecure data packets; and inserting each of the secure data packets into the output data stream based on the predetermined schedule.

3. The method of claim 2, wherein the step of inserting the each of the secure data packets into the output data stream based on the predetermined schedule comprises:

inserting the each of the secure data packets into the output data stream based on a corresponding time at which the each of the secure data packets is to be sent to the next node.

4. A method for transmitting secure data packets to a number of secure destination devices, the method comprising:

establishing a predetermined schedule that identifies specific times at which each node in a node network transmits secure data packets and specific times at which secure data packets transmitted along a predetermined node pathway are received at each node in the node network, wherein propagation delays between nodes along the predetermined node pathway are taken into account when determining the times at which each node along the predetermined node pathway is scheduled to receive the secure data packets;

establishing the predetermined node pathway upon which each node along the node pathway transmits secure data packets based on the predetermined schedule;

receiving an input data stream at a node in a node network, the input data stream comprising the secure data packets and unsecure data packets;

using the specific times at which secure data packets are received as identified in the predetermined schedule to determine whether a data packet in the input data stream is a secure data packet;

separating the secure data packets from the unsecure data packets received in the input data stream based on the predetermined schedule, wherein the secure data packets are authorized to be sent to the number of secure destination devices, and wherein the unsecure data packets are not authorized to be sent to the number of secure destination devices, and wherein the predetermined node pathway identifies an ingress node at which the secure data packets may enter the node network from the number of secure inputs and an egress node at which the secure data packets may exit the node network to the number of secure destination devices; and sending the secure data packets to the number of secure destination devices as a number of secure output data streams from a number of secure outputs in the node via the predetermined node pathway until the secure data packets reach the egress node.

5. The method of claim 4, wherein the step of separating the secure data packets from the unsecure data packets received in the input data stream based on the predetermined schedule comprises:

identifying data packets in the input data stream received at specified times indicated in the predetermined schedule as the secure data packets.

6. The method of claim 4, wherein the step of sending the secure data packets to the number of secure destination devices as the number of secure output data streams comprises:

sending the secure data packets to the number of secure destination devices as the number of secure output data streams from the number of secure outputs in the node, wherein the number of secure destination devices includes at least one of a secure server, a secure end-node, a secure end-device, and a secure Web server.

7. The method of claim 4 further comprising:

sending the unsecure data packets to a set of unsecure destination devices as a set of unsecure output data streams from a set of unsecure outputs in the node, wherein the unsecure data packets include at least one of unsecure authorized data packets and unsecure unauthorized data packets.

8. A node in a node network, the node comprising:

a number of secure inputs comprising hardware equipment configured to receive secure data packets, wherein the secure data packets are authorized to be sent to a number of secure destination devices;

a set of unsecure inputs comprising hardware equipment configured to receive unsecure data packets, wherein the unsecure data packets are not authorized to be sent to the number of secure destination devices;

a timing controller comprising hardware equipment configured to control integration of the secure data packets and the unsecure data packets into an output data stream based on a predetermined schedule that identifies specific times at which each node in the node network transmits the secure data packets along a predetermined node pathway of select nodes through the node network and specific times at which secure data packets transmitted along the predetermined node pathway are received at each node in the node network, wherein propagation delays between nodes along the predetermined node pathway are taken into account when determining the times at which each node along the node pathways is scheduled to receive the secure data packets; and a number of outputs comprising hardware equipment configured to send the output data stream to a next node select nodes in the predetermined node pathway until the secure data packets reach an egress node.

9. The node of claim 8 further comprising:

a first networking device configured to receive the unsecure data packets from the set of unsecure inputs and send the unsecure data packets to the number of outputs; and a second networking device configured to receive the secure data packets from the number of secure inputs and send the secure data packets to the number of outputs.

10. The node of claim 9, wherein the timing controller is configured to control at least one of the number of secure inputs, the set of unsecure inputs, the number of outputs, the first networking device, and the second networking device using the predetermined schedule.

11. The node of claim 9, wherein the first networking device comprises:

a set of buffers.

12. The node of claim 9, wherein the second networking device comprises:

a set of buffers.

13. The node of claim 8, wherein the set of unsecure inputs is not designated to receive any secure data packets.

14. The node of claim 8, wherein the set of unsecure inputs is configured to receive the unsecure data packets from a set of unsecure source devices and wherein the number of secure inputs is configured to receive the secure data packets from a number of secure source devices.

15. The node of claim 8, wherein the unsecure data packets include at least one of unsecure authorized data packets and unsecure unauthorized data packets.

16. A node in a node network, the node comprising:

an input comprising hardware equipment configured to receive an input data stream from a previous node in a predetermined node pathway in the node network, wherein the input data stream comprises secure data packets and unsecure data packets, wherein the secure data packets are authorized to be sent to a secure destination device and the unsecure data packets are not authorized to be sent to the secure destination device;

a timing controller comprising hardware equipment configured to separate the secure data packets from the unsecure data packets received in the input data stream based on a predetermined schedule, wherein the predetermined schedule identifies times at which the previous node transmits the secure data packets along the predetermined node pathway and specific times at which secure data packets transmitted along the predetermined node pathway are received at each node in the node network, wherein propagation delays between nodes along the predetermined node pathway are taken into account when determining the times at which each node along the node pathways is scheduled to receive the secure data packets, and wherein the timing controller is configured to use the specific times at which secure data packets are received as identified in the predetermined schedule to determine whether a data packet in the input data stream is a secure data packet; and a secure output comprising hardware equipment configured to send the secure data packets to a next node in the predetermined node pathway based on the predetermined schedule to the secure destination device as a secure output data stream until the secure data packets reach an egress node.

17. The node of claim 16 further comprising:

an unsecure output comprising hardware equipment configured to send the unsecure data packets to an unsecure destination device as an unsecure output data stream.

18. The node of claim 17 further comprising:

a first networking device configured to receive the unsecure data packets from the input and send the unsecure data packets to the unsecure output; and a second networking device configured to receive the secure data packets from the input and send the secure data packets to the secure output.

19. The node of claim 18, wherein the timing controller is configured to control at least one of the input, the secure output, the unsecure output, the first networking device, or the second networking device using the predetermined schedule.

20. The node of claim 16, wherein the unsecure data packets include at least one of unsecure authorized data packets or unsecure unauthorized data packets.

* * * * *

UNITED STATES PATENT AND TRADEMARK OFFICE
CERTIFICATE OF CORRECTION

PATENT NO. : 9,813,384 B2
APPLICATION NO. : 13/664966
DATED : November 7, 2017
INVENTOR(S) : Howe et al.

Page 1 of 1

It is certified that error appears in the above-identified patent and that said Letters Patent is hereby corrected as shown below:

In the Claims

Column 16, Line 19, "along" should be deleted.

Signed and Sealed this
Tenth Day of July, 2018

Andrei Iancu
*Director of the United States Patent and Trademark Office*